US012722835B2

(12) United States Patent
Bardini

(10) Patent No.: US 12,722,835 B2
(45) Date of Patent: Sep. 1, 2026

(54) LABELING MACHINE

(71) Applicant: P.E. LABELLERS S.P.A., Porto Mantovano (IT)

(72) Inventor: Riccardo Bardini, Torri del Benaco (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 131 days.

(21) Appl. No.: 18/036,986

(22) PCT Filed: Dec. 13, 2021

(86) PCT No.: PCT/EP2021/085386
§ 371 (c)(1),
(2) Date: May 15, 2023

(87) PCT Pub. No.: WO2022/128857
PCT Pub. Date: Jun. 23, 2022

(65) Prior Publication Data

US 2023/0415946 A1 Dec. 28, 2023

(30) Foreign Application Priority Data

Dec. 15, 2020 (IT) ........................ 102020000030812

(51) Int. Cl.
*B65C 9/18* (2006.01)

(52) U.S. Cl.
CPC .............. *B65C 9/1819* (2013.01); *B65C 9/18* (2013.01); *B65C 9/1803* (2013.01); *B65C 9/1807* (2013.01); *B65C 9/1815* (2013.01)

(58) Field of Classification Search
CPC ....... B65C 9/1803; B65C 9/18; B65C 9/1819; B65C 9/1815; B65C 9/1807; B65C 2009/1838
See application file for complete search history.

(56) References Cited

U.S. PATENT DOCUMENTS 2,703,660 A * 3/1955 Von Hofe ................. B65C 3/16 156/499
5,779,835 A 7/1998 Rello et al.
(Continued)

FOREIGN PATENT DOCUMENTS

EP 1 386 843 A1 2/2004
EP 2109089 A2 10/2009
(Continued)

OTHER PUBLICATIONS (PCT) European Patent Office, International Search Report and Written Opinion issued Aug. 13, 2021 which pertains to International Application No. PCT/EP2021/085386, 8 pages.

*Primary Examiner* — George R Koch
*Assistant Examiner* — Christopher C Caillouet
(74) *Attorney, Agent, or Firm* — THOMPSON HINE LLP

(57) ABSTRACT

A labeling machine including a conveyor of containers to be labeled along an advancement path and at least one labeling station arranged along the advancement path. The labeling station includes an assembly for unwinding a label ribbon, on which multiple labels are printed in succession, and at least one drum designed to receive on a lateral surface thereof the label ribbon and/or the labels obtained by cutting the label ribbon. Multiple sliders are arranged at the peripheral region of the drum; at least one of the sliders has contact regions designed to engage by contact the label ribbon and/or the labels, provided with a different degree of mutual adherence with respect to the material of which the label ribbon is made.

12 Claims, 14 Drawing Sheets

(56) References Cited

U.S. PATENT DOCUMENTS

| | | | |
|---|---|---|---|
| 5,858,143 | A | 1/1999 | Bright et al. |
| 11,993,415 | B2 * | 5/2024 | Schinelli ............... B65C 9/1807 |
| 2011/0168334 | A1 | 7/2011 | Kramer et al. |
| 2014/0000803 | A1 | 1/2014 | Carmichael |
| 2014/0166344 | A1 | 6/2014 | Kato et al. |
| 2014/0209247 | A1 | 7/2014 | Carmichael et al. |
| 2015/0035228 | A1 | 2/2015 | Carmichael et al. |
| 2017/0166344 | A1 | 6/2017 | Carmichael et al. |
| 2020/0231319 | A1 * | 7/2020 | Deckert ................ B65C 9/1819 |

FOREIGN PATENT DOCUMENTS

| | | | |
|---|---|---|---|
| EP | 2772448 | A1 | 9/2014 |
| JP | H 0457729 | A | 2/1992 |
| JP | H9502682 | A | 3/1997 |
| JP | 2008184173 | A | 8/2008 |

* cited by examiner

LABELING MACHINE

The present invention relates to a labeling machine.

As is known, labeling machines that allow to apply to containers labels obtained by cutting a continuous label ribbon are widespread commercially.

Typically, labeling machines are provided with a conveyor of the containers which comprises, usually, a rotating carousel provided, peripherally, with rotatable plates for supporting the individual containers, which allow, in turn, to rotate the containers about their axes.

At least one labeling station is arranged along the perimeter of the carousel and is designed to apply a respective label to each individual container arranged on the carousel.

Each labeling station has, generally, an unwinding assembly which is designed to unwind the label ribbon from its reel and to feed it to at least one drum, which is actuated in rotation and designed to receive, on its own lateral surface, the label ribbon provided by the unwinding assembly, which it retains by virtue of suction ports formed on said lateral surface thereof.

In some machines there are, in mutual succession, a first drum, termed cutting drum, which is provided with blades which allow to cut the label ribbon at the separation region between two consecutive labels, and a second drum, termed transfer drum, which receives the separated labels after cutting to move them to adhere to the respective container arriving on the carousel.

In other machines there is a single drum, termed cutting and transfer drum, which allows to both cut the label ribbon, by virtue of blades mounted thereon, and transfer the cut labels to the corresponding containers.

In this case, the label ribbon is fed directly from the unwinding assembly to the cutting and transfer drum.

It should be noted that the label ribbon may have, on the face designed to make contact with the containers, pre-applied portions of glue or, as an alternative, it can also be free from pre-applied glue.

In the background art, labeling machines designed to process labeling ribbons free from pre-applied glue have a gluing assembly, usually arranged laterally adjacent to a drum of the labeling station, normally constituted, as appropriate, by the transfer drum or by the cutting and transfer drum.

In particular, the gluing assembly is in turn constituted for example by a glue spreading roller, which applies to each one of the labels resting on the drum to which it is laterally adjacent two strips of glue, one at the leading end of the individual label and the other at the trailing end of same label.

In particular, the drum on which the application of the glue to the labels occurs is typically divided along its own circumferential extension into multiple sectors or divisions, each one of which is designed to receive a single label from the cutting drum.

At the opposite ends of the various sectors of this drum there are two gluing regions, which are arranged in relief with respect to the remaining part of the lateral surface of said drum and are in practice formed by respective blocks, usually called sliders or pads, on which the leading and trailing ends of the labels rest, so that during the passage of the labels at the glue spreading roller the spreading roller applies to the labels just two strips of glue indeed at the leading and trailing ends of the labels.

It should be noted that even on labeling machines configured to process pre-adhesive label ribbons, the transfer drum is provided with sliders, arranged at the ends of each sector or division of the drum and constituted respectively by a leading slider and a trailing slider. Such sliders allow to retain the label ribbon during cutting and, during the transfer to the container, the trailing slider, together with the remaining part of the sector, keeps the label under tension while the container winds it onto itself.

Moreover, some types of labeling machine have, during their operation, steps in which the label ribbon that is transferred to a drum undergoes a sliding movement with respect to the drum and steps in which the label ribbon moves in practice at the same speed as the lateral surface of the drum, being practically stationary with respect to it.

This is the case, for example, of the labeling machine described in EPA 17835622.6 in the name of this same Applicant.

This machine comprises a transfer drum which receives the label ribbon from the unwinding assembly in adhesion against its own lateral surface and which has, regularly distributed along its peripheral region, a plurality of cutting devices, which can be activated independently of each other, to cut the label ribbon between two consecutive labels, and a plurality of gluing regions, constituted by sliders in relief with respect to the remaining part of the lateral surface of the transfer drum, which are each arranged in a position that immediately precedes a respective cutting device, along the direction of rotation of the transfer drum, and which are designed to receive by resting contact the leading and trailing edges of the labels present on the label ribbon, in order to allow, in cooperation with the spreading roller, the application, on the leading and trailing edges of the labels, of respective strips of glue before the execution of the cutting of the label ribbon.

During the operation of this machine there are steps in which the unwinding assembly feeds the label ribbon to the transfer drum at a speed that is synchronized with the peripheral speed of the transfer drum, such as when the slider on which, at a given time, the leading and trailing edges of two consecutive labels of the label ribbon are resting, passes at the spreading roller, so that the spreading roller can apply the glue, or such as when the cutting of the label ribbon is performed, and other steps in which the unwinding assembly feeds the label ribbon to the transfer drum at a lower speed than the peripheral speed of the cutting drum, so that the transfer drum can slide over the label ribbon, such as when the cutting device located directly behind the gluing region that has passed at the spreading roller is placed at the separation portion between the two labels that have received the glue, so that it can cut the label ribbon between one label and the other.

It is clear, therefore, that during the operation of the machine there are situations in which the sliders that constitute the gluing regions of the labels must ensure a stable retention of the labels or of the label ribbon so as to ensure a movement of the label ribbon that is perfectly integral with the motion of the drum, such as during the steps of gluing the label ribbon or of applying the labels to the containers, and situations in which, instead, it is necessary to ensure an optimum sliding of the slider on the label ribbon or on the labels.

The sliders mounted on the drums of current labeling machines are unable to adequately meet the requirements described above.

The aim of the present invention is to provide a labeling machine that is capable of improving the background art in one or more of the above mentioned aspects.

Within this aim, an object of the invention is to provide a labeling machine in which the sliders mounted on the drum of the machine are capable of operating in an optimum way both during the steps in which the drum slides on the label ribbon and during the steps in which retention of the label ribbon integrally to the drum is required.

Another object of the invention is to provide a labeling machine that is capable of giving the greatest assurances of reliability and safety.

A further object of the present invention is to overcome the drawbacks of the background art in a manner that is alternative to any existing solutions.

Not least object of the invention is to provide a labeling machine that is relatively easy to provide and can be manufactured at competitive costs.

This aim and these and other objects which will become better apparent hereinafter are achieved by a labeling machine according to claim 1, optionally provided with one or more of the characteristics of the dependent claims.

Further characteristics and advantages of the invention will become better apparent from the description of preferred but not exclusive embodiments of the labeling machine according to the invention, illustrated by way of non-limiting example in the accompanying drawings, wherein.

Figure 1:
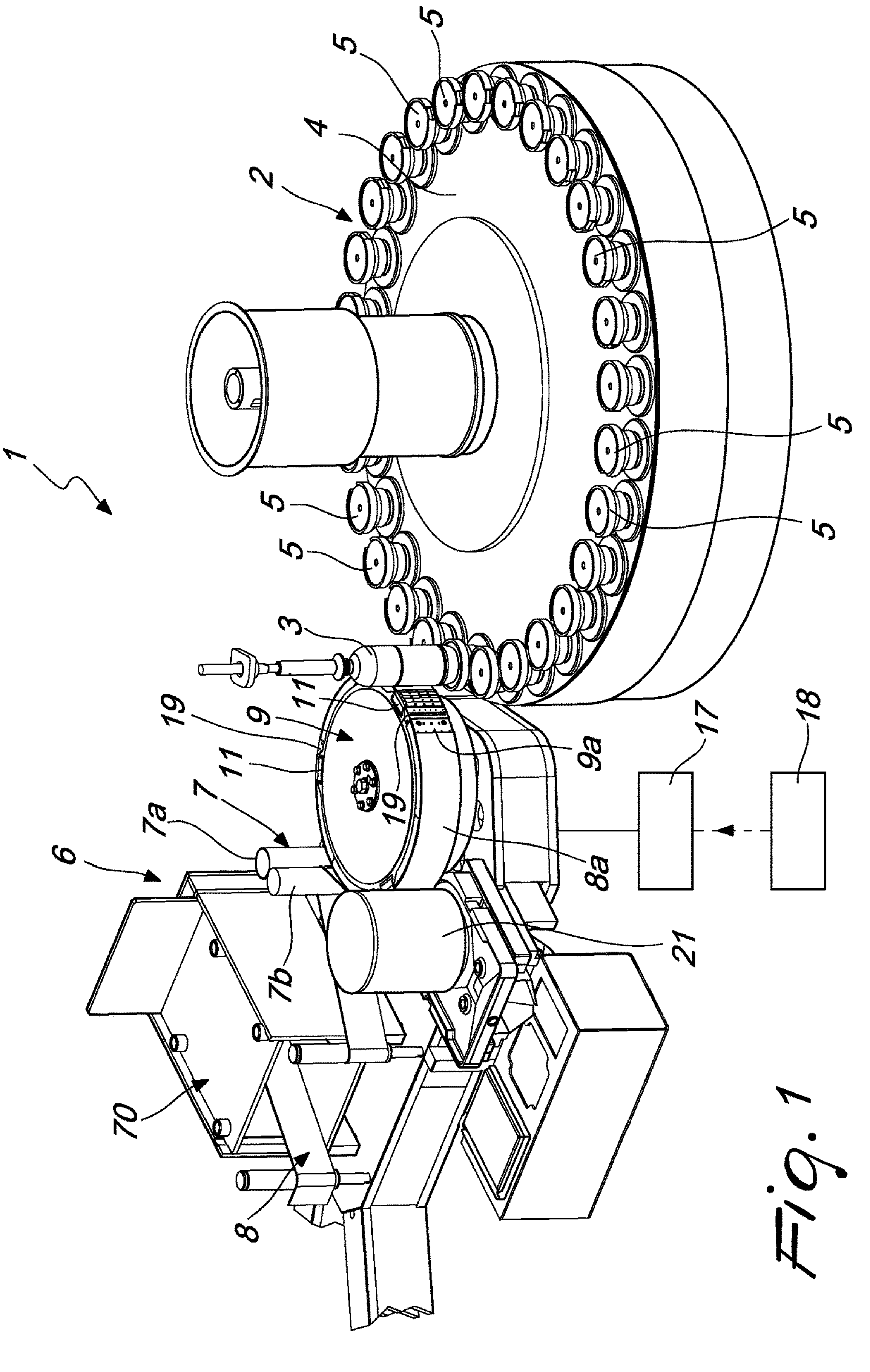
FIG. 1 is a perspective view of a first embodiment of the labeling machine according to the invention.
Figure 2:
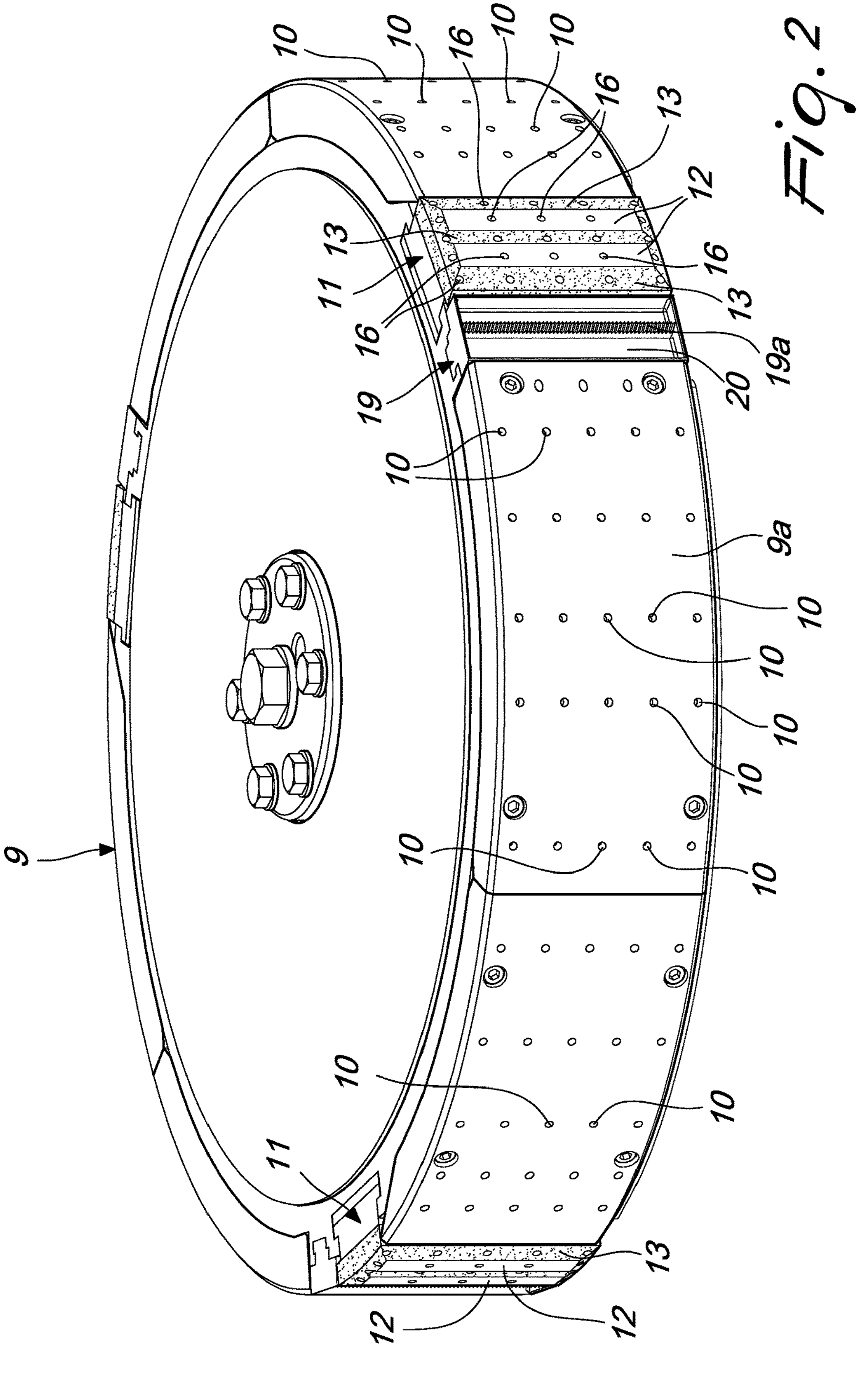
FIG. 2 is a perspective view of a drum of the first embodiment of the machine according to the invention.
Figure 3:
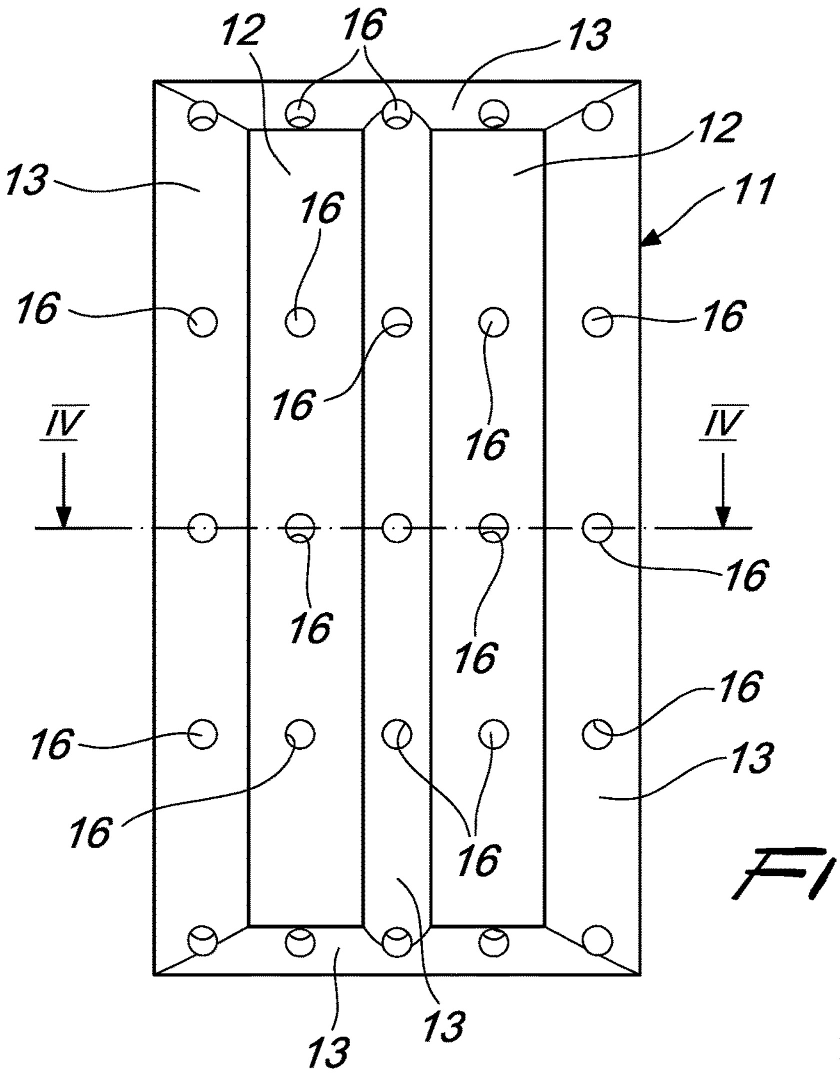
FIG. 3 is a front view of a slider of the first embodiment of the machine according to the invention.
Figure 4:
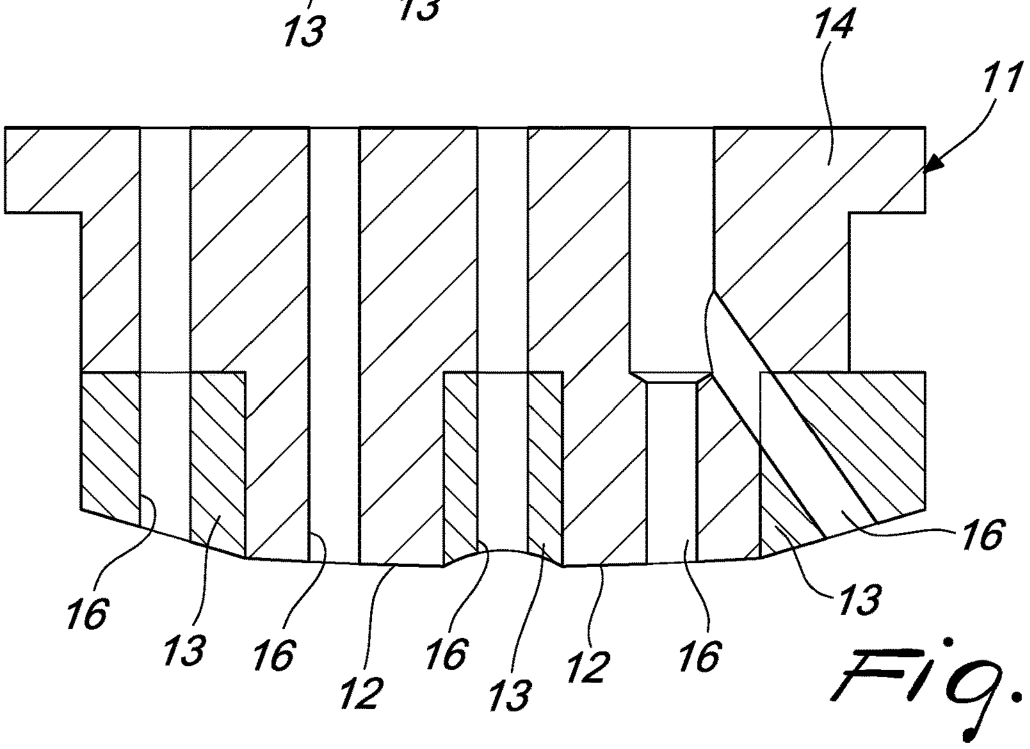
FIG. 4 is a sectional view, taken along the plane IV-IV of FIG. 3.
Figure 5:
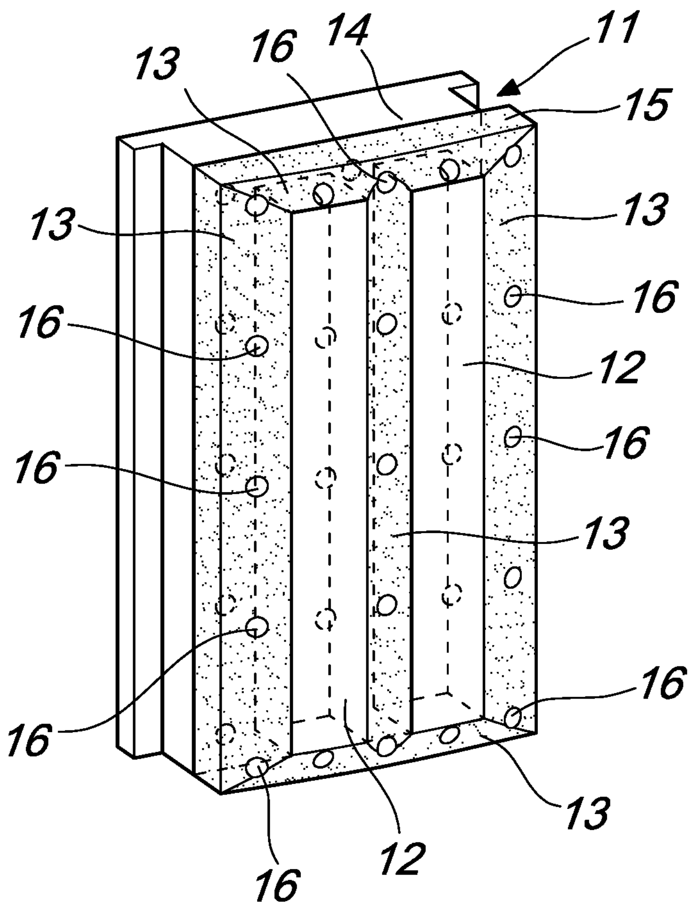
FIG. 5 is a perspective view of the slider of FIG. 3.
Figure 6:
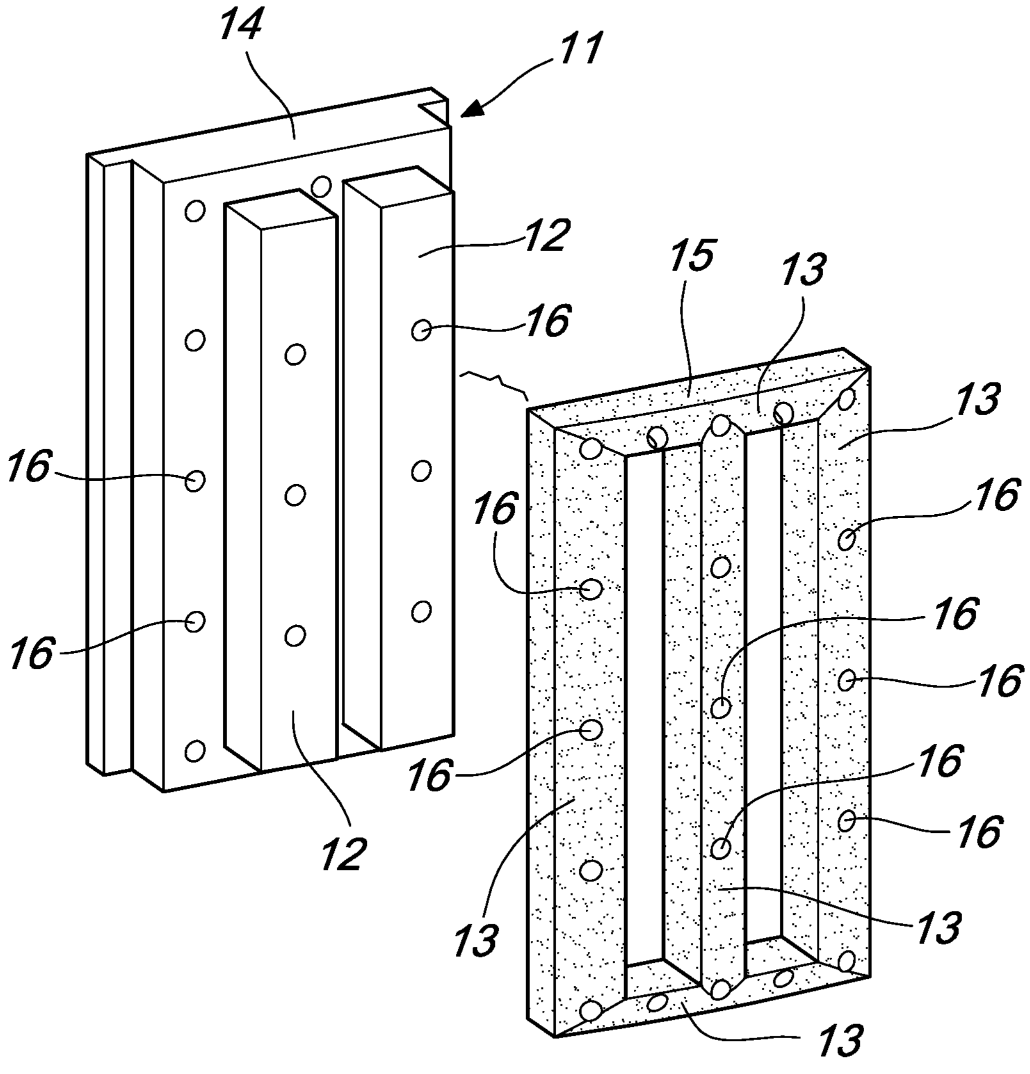
FIG. 6 is an exploded perspective view of the slider of FIG. 3.

With reference to the figures, the labeling machine according to the invention, generally designated by the reference numeral 1, comprises a conveyor 2 for conveying the containers 3 to be labeled along an advancement path 2*a*.

For example, the conveyor 2 consists of a carousel 4 provided peripherally with rotating plates 5, each of which supports a single container 3.

Along the advancement path 2*a* of the containers 3 formed by the conveyor 2 there is at least one labeling station 6 which comprises an unwinding assembly 7, which is constituted for example by a pair of mutually opposite traction rollers 7*a*, 7*b* and allows to draw from a reel, not shown, a label ribbon 8 which conveniently, before reaching the unwinding assembly 7, is passed through an alignment and tension adjustment device and which bears, printed thereon with continuity, a plurality of labels 8*a* which are designed to be separated from the label ribbon 8 by cutting.

The label ribbon 8 can be, optionally, free from pre-applied glue, as in the case of the embodiments of FIGS. 1-9 and FIGS. 13-15, or may be of the pre-adhesive type, as in the case of the embodiment of FIGS. 10-12 and as will be explained better hereinafter.

Furthermore, the labeling station 6 has at least one drum 9 which is designed to receive on its own lateral surface the label ribbon 8 and/or the labels 8*a* obtained by cutting the label ribbon 8.

For this purpose, the drum 9 is conveniently provided, on its own lateral surface 9*a*, with suction ports 10, which allow to generate an action of retention of the label ribbon 8 in adherence against the lateral surface of the drum 9.

At the peripheral region of the drum 9 there is, moreover, a plurality of sliders 11, which are mutually angularly spaced around the axis of the drum 9.

In particular, the sliders 11 have, as per se known, at least one portion in relief toward the outside with respect to the remaining part of the lateral surface 9*a* of the drum 9.

At least one of the sliders 11, and more preferably each one of the sliders 11, has, within itself, contact regions 12, 13 which are designed to engage by contact the label ribbon 8 and/or the labels 8*a*, which have a different degree of mutual adherence with respect to the material of which the label ribbon 8, and therefore said labels, are made, i.e., are capable of having with respect to each other a different capacity to adhere to the label ribbon 8 and to the labels 8*a*.

In particular, said contact regions 12, 13 are made of respective materials having mutually different friction coefficients with respect to the material of which the label ribbon 8 and therefore the labels 8*a* are made.

In particular, the contact regions 12, 13 of the sliders 11 comprise, conveniently, at least one first contact region 12, which is made of a first material, and at least one second contact region 13, which is made in turn of a second material, different from the first material.

Such first material has, with respect to the material of which the label ribbon 8 is made, a first friction coefficient, while the second material has, again with respect to the material of which the label ribbon 8 is made, a second friction coefficient which is greater than the first friction coefficient.

Advantageously, the second material consists of a material that has a greater elastic deformability under compression with respect to the first material.

For example, the first material can be constituted by a metallic material, such as, for example, aluminum, or other similar material, and the second material can be constituted by a plastic material, such as rubber, more preferably hard rubber, or other similar material.

Advantageously, the first contact region 12 is arranged substantially in a central part of the face of the corresponding slider that is designed to make contact with the label ribbon 8 or the labels 8*a*, while the second contact region 13 is arranged in a peripheral region of the face of the corresponding slider 11 that is designed to make contact with the label ribbon 8 or the labels 8*a*.

In greater detail, it is possible to provide one or more first contact regions 12 in the central part of the face of the slider 11 that is designed to make contact with the label ribbon 8 or the labels 8*a* and at least two second contact regions 13 arranged laterally to the first contact region or regions 12 and arranged, more particularly, substantially at the front edge and the rear edge of the corresponding slider 11, respectively, along the direction of rotation of the drum 9.

For example, in some embodiments of the invention, in a central part of the face of each slider 11 adapted to make contact with the label ribbon 8 or the labels 8*a*, there can be multiple first contact regions 12, arranged mutually side by side, which are extended substantially parallel to the axis of the drum 9, and between the first contact regions 12 and along the perimeter edges of the face of each slider 11 adapted to make contact with the label ribbon 8 or the labels 8*a* there can be second contact regions 13.

Conveniently, each first contact region 12 is arranged, with respect to the second contact regions 13, at a greater distance from the remaining part of the lateral surface 9*a* of the drum 9, being thus more in relief than the second contact regions 13 from the remaining part of the lateral surface 9*a* of the drum 9.

In particular, besides being located at a greater distance from the axis of the drum 9 with respect to the remaining part of the lateral surface of said drum, the first contact regions 12 of the sliders 11 can be arranged on surfaces which are substantially planar or optionally provided with a smaller curvature than the remaining part of the lateral surface 9*a* of the drum 9 and are extended substantially parallel to the axis of the drum 9.

Advantageously, the second contact regions 13 arranged along the edges of the face of the slider that is adapted to make contact with the label ribbon 8 or the labels 8*a* are instead arranged, preferably at least in their part closest to the first contact regions 12, on inclined surfaces, progressively closer to each other starting from the axis of the drum 9 outward, thus creating a blending bevel between the first contact regions 12 and the remaining part of the lateral surface 9*a* of the drum 9, while, if present, the second contact region 13 located between two first contact regions 12 located in the central part of the slider 11 may be arranged in a groove or recess, which may be for example substantially V-shaped or U-shaped in a transverse cross-section.

Advantageously, each slider 11 is constituted, in practice, by a base body 14, which is coupled, preferably detachably, to the drum 9 and is made of said first material.

Each slider 11 has, moreover, at the second contact regions 13, at least one locking layer 15 made of the second material and fixed to the base body 14. The fixing of the locking layer 15 to the base body 14 can be performed by adhesive bonding or, more preferably, by overmolding the second material on the base body 14.

Conveniently, the sliders 11 of the drum 9 have suction openings 16, which can be connected to at least one vacuum source 17 in order to apply an action of attraction of the label ribbon or of the labels to the sliders 11.

Advantageously, during the rotation of the drum 9 the suction openings 16 can be connected to the vacuum source, when the corresponding slider 11 is at preset angular positions with respect to the axis of the drum 9.

More particularly, it is possible to provide that the connection of the suction openings 16 or at least of the suction openings 16 located at the second contact regions 13 of the sliders 11 to the vacuum source 17 can occur only at the angular positions gradually assumed by the sliders 11, with respect to the axis of the drum 9, while the drum 9 is rotating, in which the sliders 11 are required to retain the label ribbon 8 or the labels 8*a* in a manner integral with the drum.

The selective connection of the suction openings 16 of the sliders 11 to the vacuum source 17 as a function of the angular position assumed, during the rotation of the drum 9, by said sliders with respect to the axis of the drum 9, can be obtained for example by means of connection slots having a circumferential extension, not shown, placed on a supporting base of the drum 9 and connected to the vacuum source 17. Such connection slots are positioned so as to face the positions occupied by the sliders 11 during the rotation of the drum 9 in which connection to the vacuum source is required, so that when the sliders 11 transit at the connection slots their suction openings 16 are connected to the vacuum source 17, while when they are in a position that does not correspond to the slots their suction openings 16 are disconnected from the vacuum source.

Conveniently, means 18 for controlling the vacuum source 17 may also be provided which are for example constituted by an electronic control unit and are suitable to vary the degree of vacuum generated by the vacuum source 17 as a function of the angular position assumed by the sliders 11 with respect to the axis of the drum 9, during the rotation of said drum, so as to create a greater suction of the label ribbon 8 or of the labels 8*a* at the angular positions of the sliders 11, in which a greater adherence to the sliders 11 by the label ribbon 8 or by the labels 8*a* is required.

With reference now to a first embodiment of the machine according to the invention, the drum 9 is constituted by a cutting and transfer drum which is designed to receive from the unwinding assembly 7 the label ribbon 8 in order to cut it and bring the labels 8*a* separated after cutting into contact with the respective containers transported by the conveyor 2.

In this case, the drum 9 has a plurality of cutting devices 19 which are circumferentially mutually spaced, each directly behind a respective slider 11, with respect to the direction of rotation of the drum 9.

For example, each cutting device 19 is constituted by a respective blade 19*a* arranged in a suction chamber 20, which is open on the lateral surface 9*a* of the drum 9 and can be connected to air suction means, constituted for example by the same vacuum source 17, for drawing the label ribbon 8 inside the suction chamber 20 and against the associated blade 19*a*, so as to cut the label ribbon 8.

Again in this case, laterally adjacent to the drum 9 there is a glue spreading roller 21, which allows, when a slider 11 passes in front of it, to apply to the label ribbon 8 resting on the slider 11 two strips of glue, respectively at the leading edge and at the trailing edge of two consecutive labels 8*a*.

In order to allow the application of the two strips of glue on the label ribbon 8, each slider 11 is, in this embodiment, provided with at least two portions that are in greater relief than its remaining part, and these portions in greater relief are constituted by first contact regions 12.

In greater detail, in this embodiment, in the central part of the face of each slider 11 designed to make contact with the label ribbon 8 or with the labels 8*a* there are at least two first contact regions 12, arranged mutually side by side, which are extended substantially parallel to the axis of the drum 9, and between the two first contact regions 12 and along the perimetric edges of the face of each slider 11 designed to make contact with the label ribbon 8 or with the labels 8*a* there are second contact regions 13, which protrude less than the remaining part of the lateral surface 9*a* of the drum 9 with respect to the first contact regions 12, as shown in particular in FIGS. 3 to 6.

Figure 10:
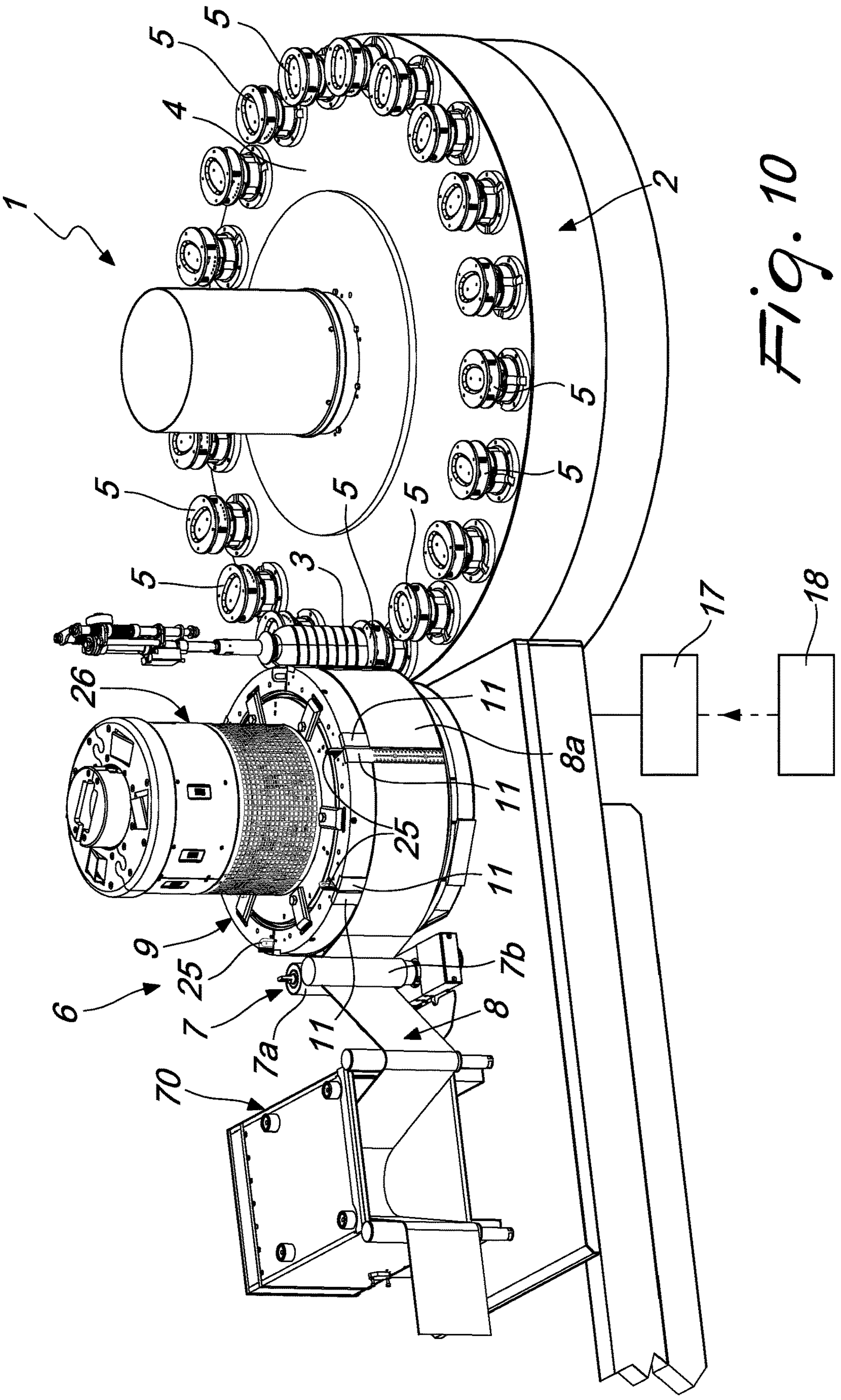
FIG. 10 is a perspective view of a second embodiment of the machine according to the invention.
Figure 11:
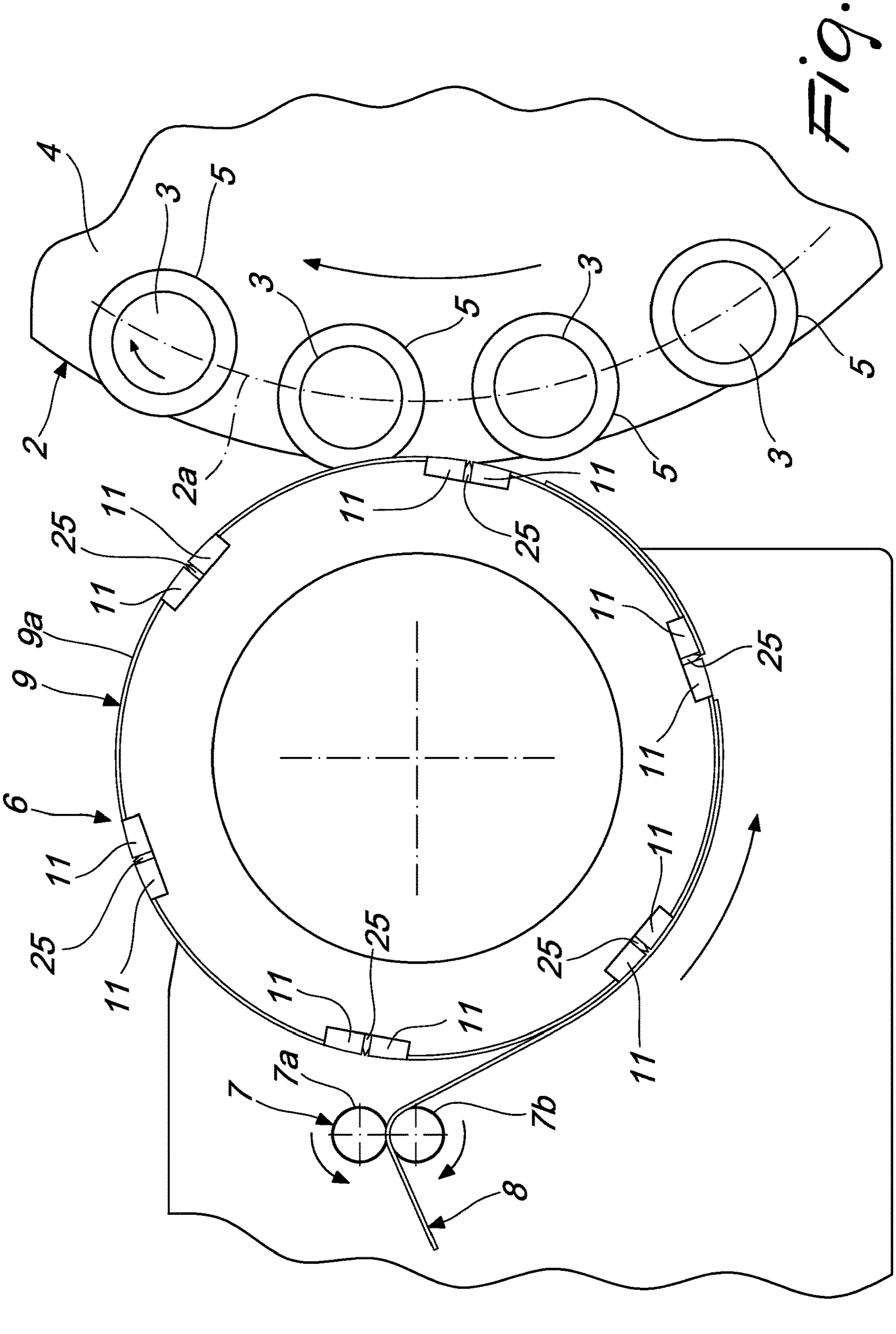
FIGS. 11 and 12 are schematic sequential top plan views of two different steps of the operation of the second embodiment of the machine according to the invention.
Figure 12:
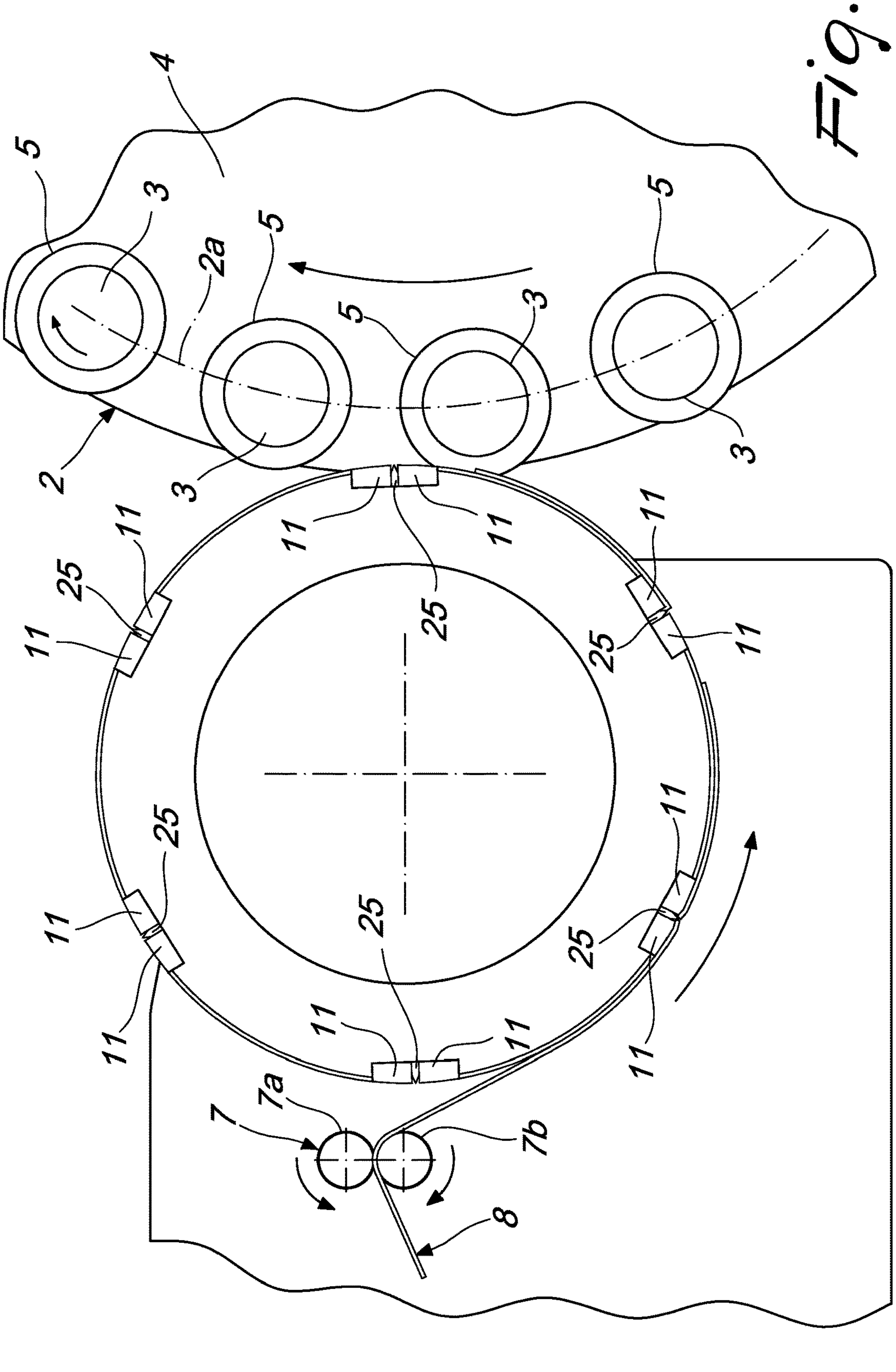

FIGS. 10, 11 and 12 instead show a second embodiment of the machine according to the invention which is suitable for processing pre-adhesive label ribbons 8, i.e., ribbons already provided on the reel with strips of glue pre-applied to the leading and trailing ends of the individual labels 8*a* or, optionally, provided with a layer of glue on the entire surface of their face designed to be coupled to the containers 3.

In the second embodiment, the drum 9 is constituted by a cutting and transfer drum, provided with a plurality of cutting elements 25 designed to cut the label ribbon 8*a*, circumferentially mutually spaced along the peripheral region of the drum 9 and controlled by respective actuation means 26, which include, for example, pneumatic pistons.

In this case, each one of the cutting elements 25 is interposed between a respective pair of sliders 11, on which the trailing end of a label 8*a* and the leading end of the immediately following label along the label ribbon 8 are designed to rest, respectively.

Also in this case, the sliders 11 of each pair conveniently have a first contact region 12 each, located advantageously in the central part of their face designed to make contact with the label ribbon 8 and with the labels 8*a*, and one or more second contact regions 13, in the peripheral portions of their face that is configured to make contact with the label ribbon 8 and the labels 8*a*.

Figure 13:
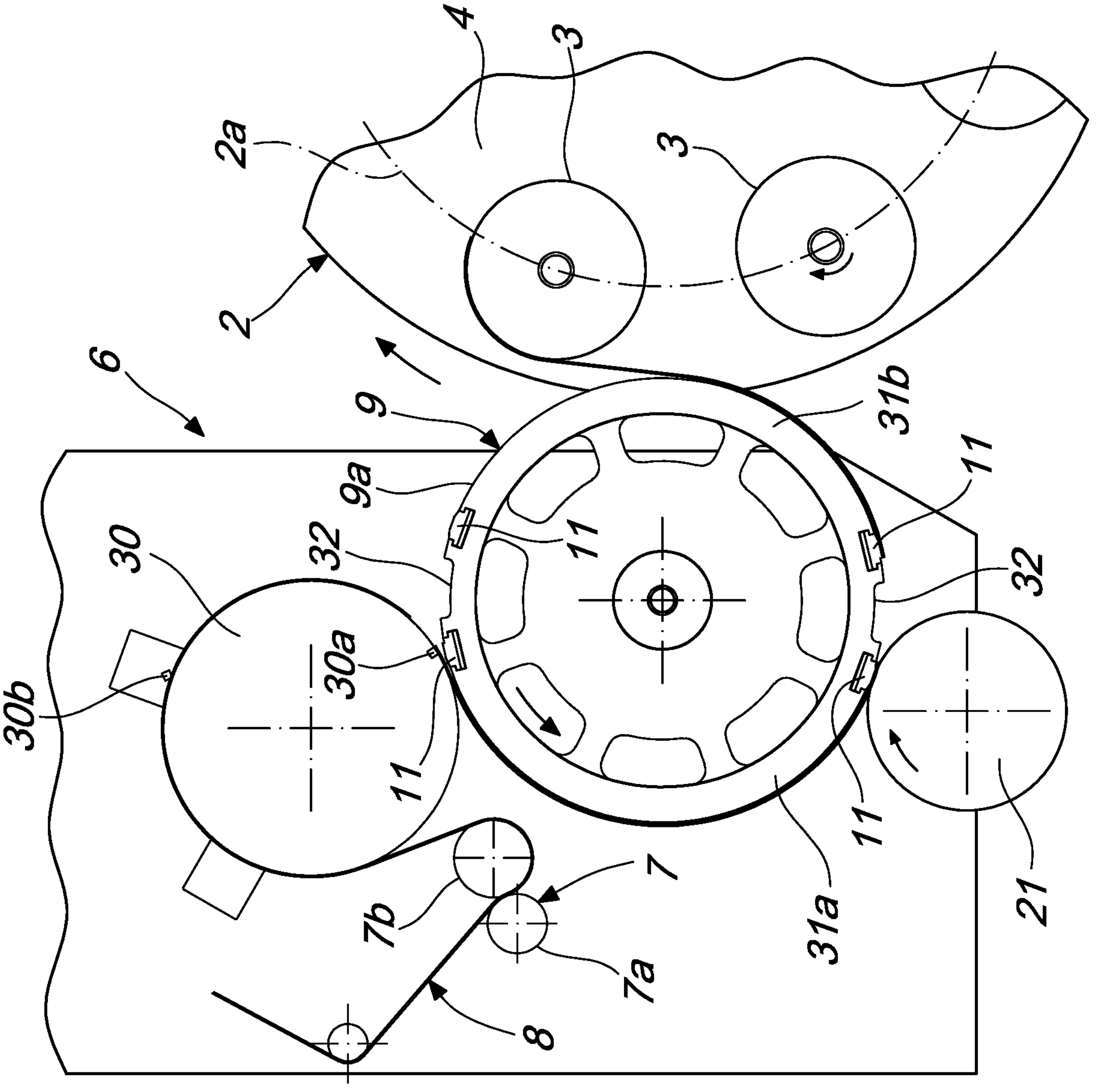
FIGS. 13, 14 and 15 are schematic sequential top plan views of some operating steps of a third embodiment of the machine according to the invention.
Figure 14:
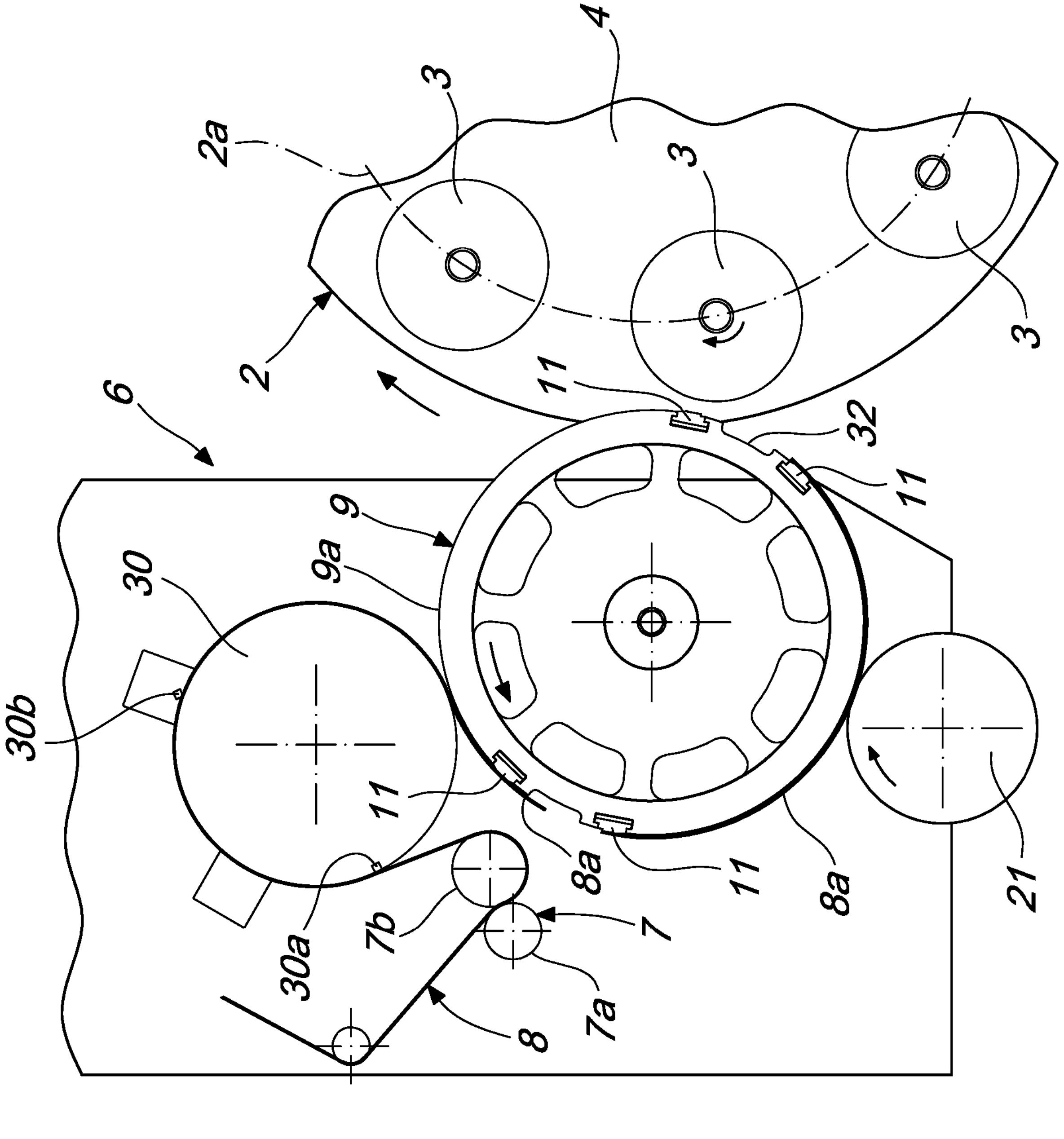
Figure 15:
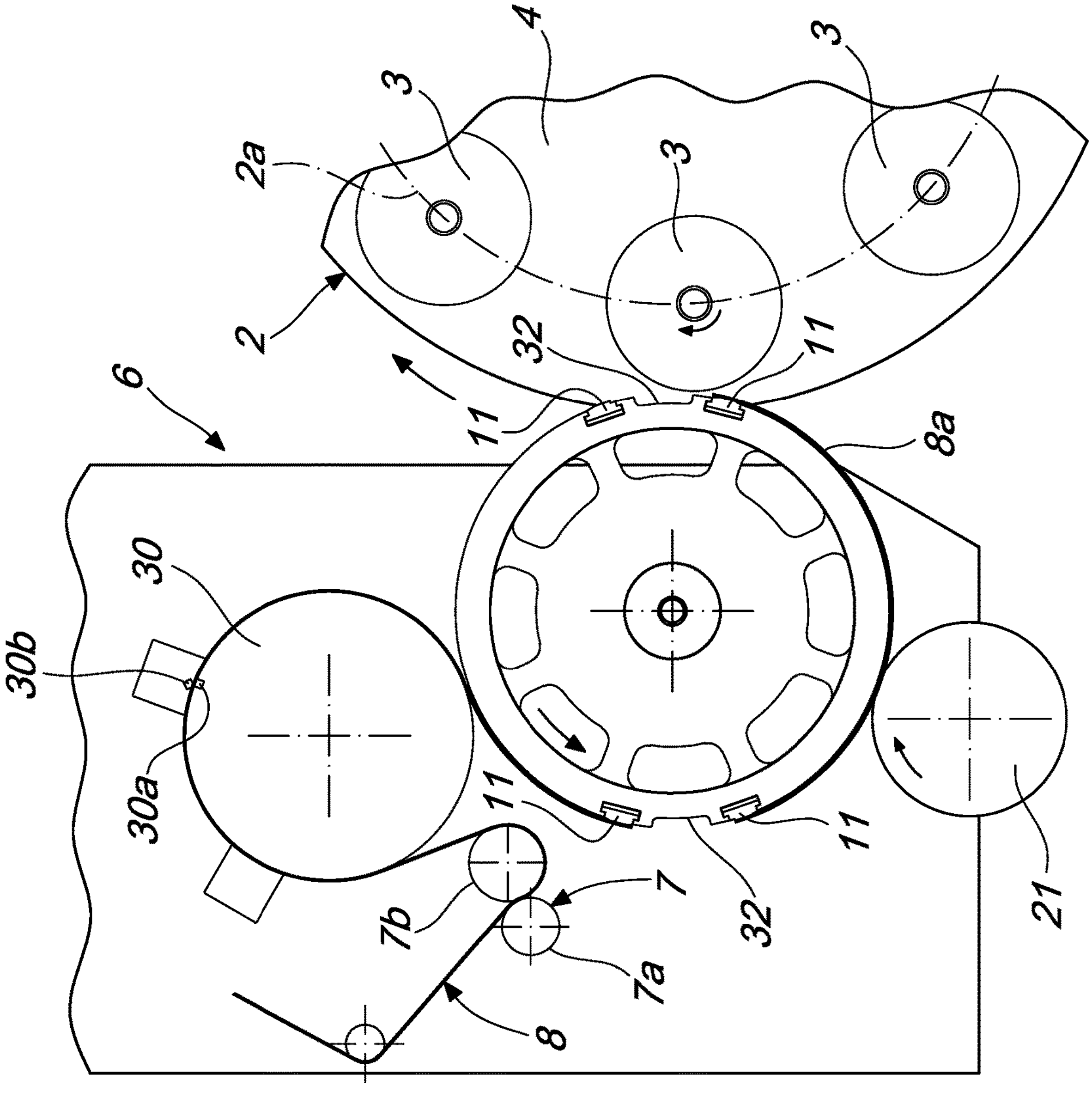

FIGS. 13, 14 and 15 show a third possible embodiment of the machine according to the invention, in which the drum 9 is constituted by a transfer drum which receives on its own peripheral region the labels 8*a* already cut by a cutting roller 30, fed by the unwinding assembly 7, which, for example, supports a movable blade 30*a*, integral with the rotary motion of the cutting roller 30 and adapted to interact with a fixed blade 30*b*, integral with the supporting structure of the machine, to cut the label ribbon 8.

In this case, one or more sectors or divisions 31*a*, 31*b* are provided along the lateral surface 9*a* of the drum 9 and are designed to receive a single label 8*a* each from the cutting roller 30.

Such sectors 31*a*, 31*b* of the drum 9 are conveniently mutually spaced apart by circumferential separation portions 32 and each one has, at the respective circumferential ends, two sliders 11, respectively a leading slider and a trailing slider, according to the direction of rotation of the drum 9, on which the leading end and the trailing end of the single label 8*a* received from the sector 31*a*, 31*b*, respectively, are designed to rest.

Moreover, a glue spreading roller 21 is arranged laterally adjacent to the drum 9 and allows to apply, during the passage thereat of the sliders 11 of the sectors 31*a*, 31*b*, glue strips to the leading and trailing ends of the labels 8*a* resting on the sliders 11.

In this case, the sliders 11 of each sector 31*a*, 31*b* may conveniently have a first contact region 12 substantially in the central part of their face designed to rest against the labels 8*a* and one or more second contact regions 13 arranged laterally to the first contact region 12.

The operation of the labeling machine according to the invention is as follows.

Figure 7:
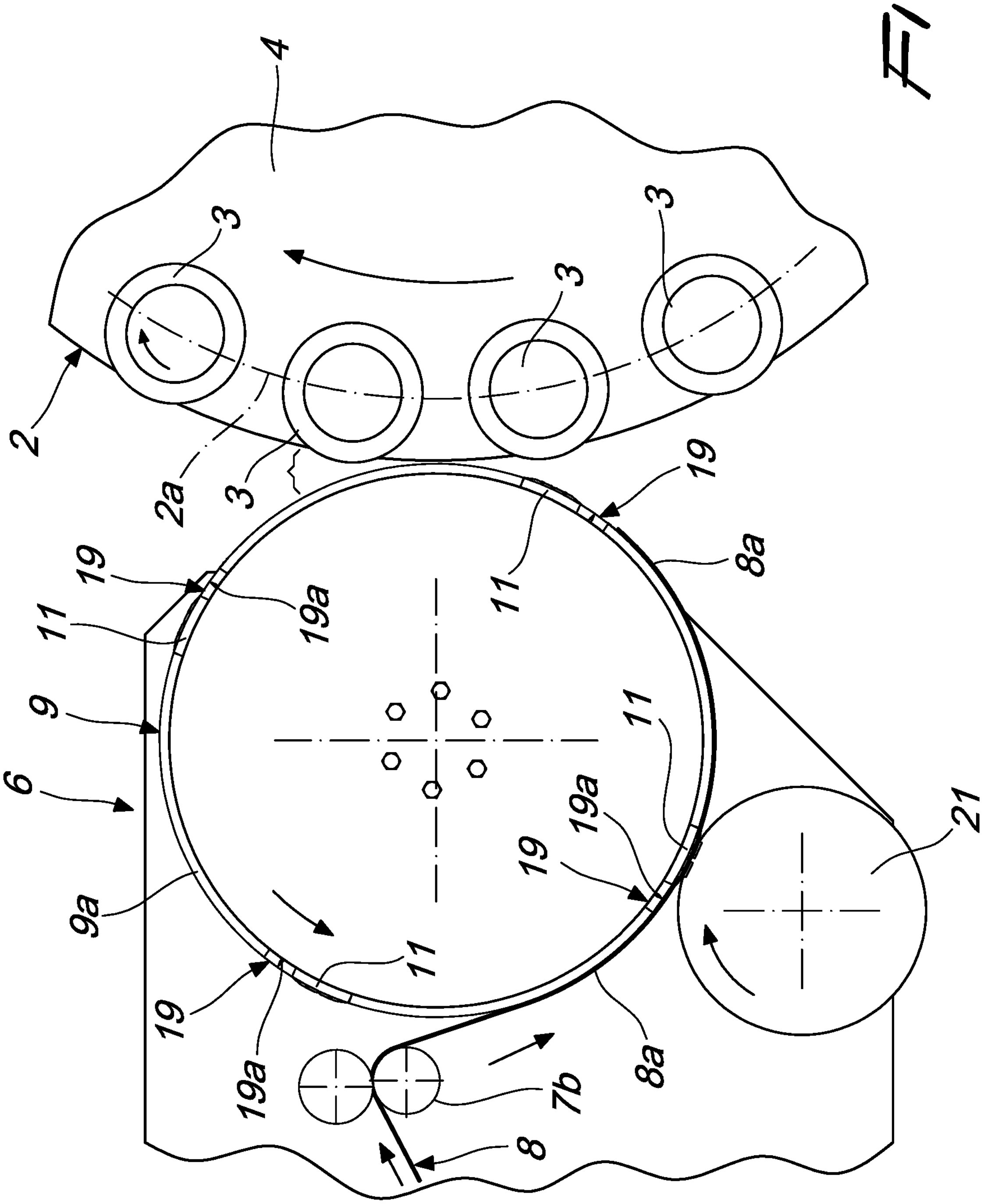
FIGS. 7, 8 and 9 are schematic top views of a sequence of operating steps of the first embodiment of the machine according to the invention.
Figure 8:
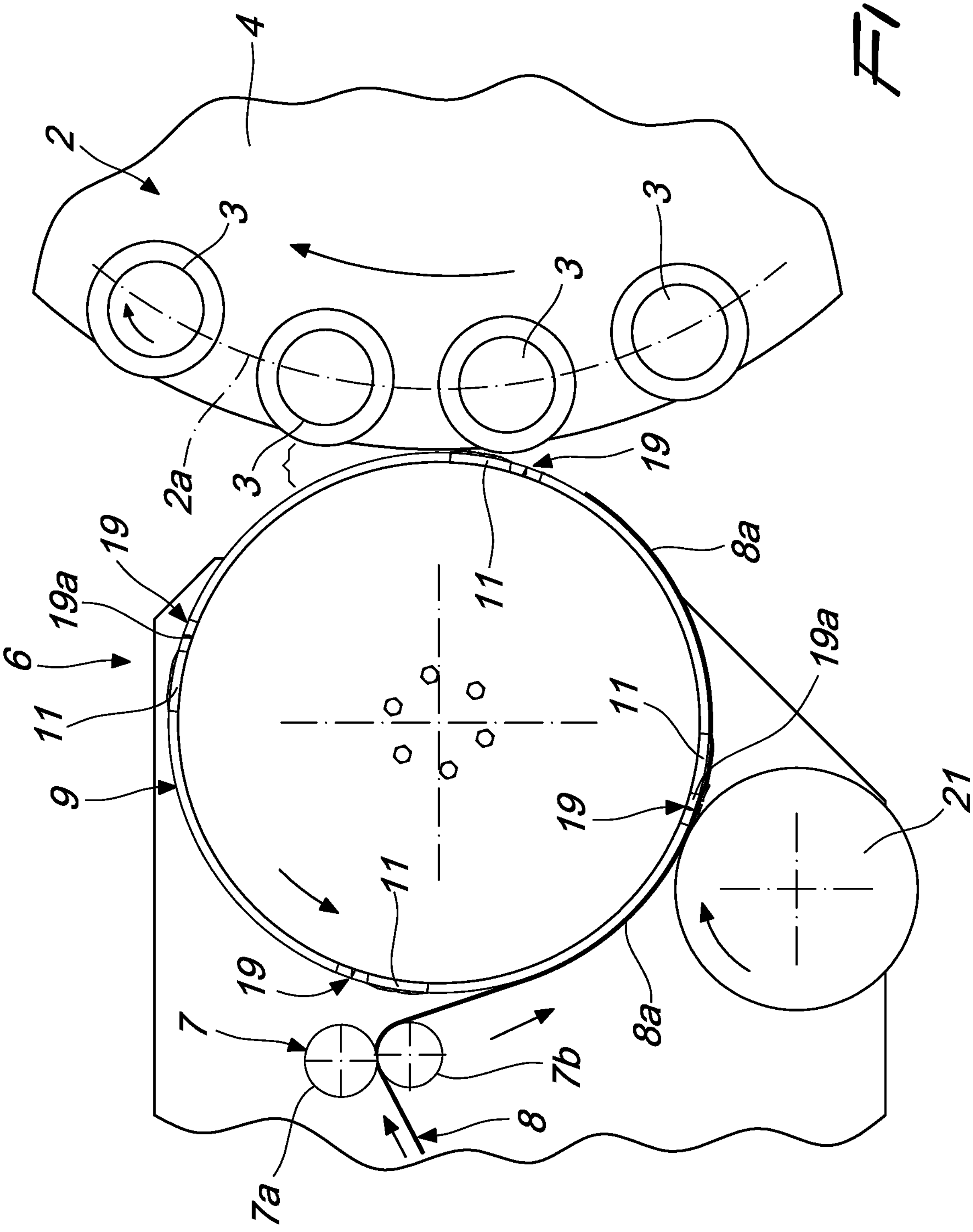
Figure 9:
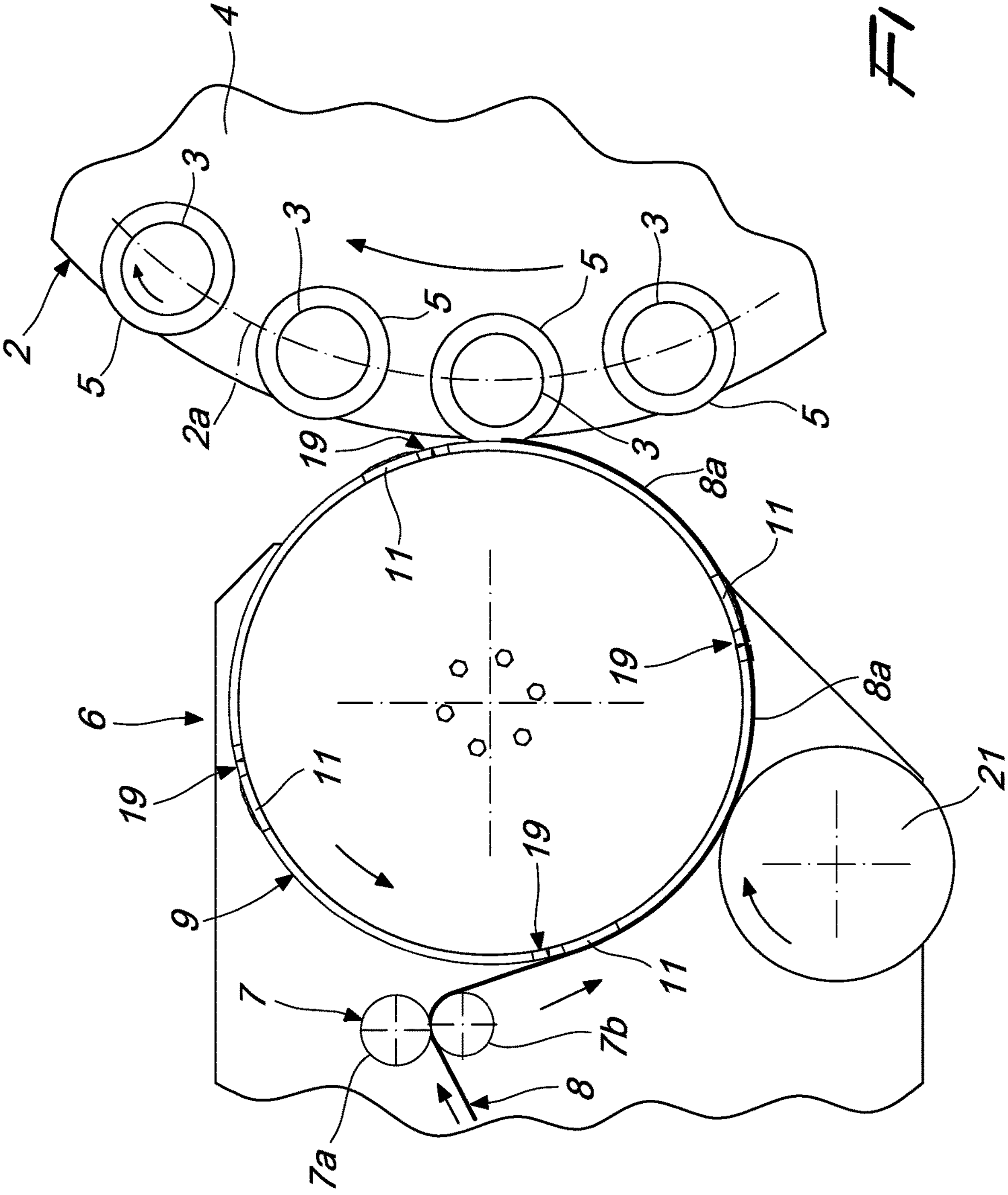

With reference to the first embodiment and in particular to FIGS. 7, 8 and 9, in a first step of operation, the unwinding assembly 7 feeds the label ribbon 8 to the drum 9 with a speed that is slightly lower than the peripheral speed of the drum 9.

In the situation shown in FIG. 7, a slider 11 of the drum 9 is in contact with the trailing end of a first label 8*a* of the label ribbon 8 and with the leading end of a second label 8*a* that immediately follows the first label 8*a* along the label ribbon 8, and said slider 11 is in an angular position with respect to the axis of the drum 9 in which it is substantially in front of the spreading roller 21, so that the label ribbon 8*a* resting thereon can receive glue at the trailing end of the first label 8*a* and at the leading end of the second label 8*a*.

In this angular position of the above mentioned slider 11, its suction openings 16 communicate with the vacuum source 17, so as to create an adequate adhesion of the label ribbon 8 to the second contact regions 13 of the slider 11, thus allowing the latter to ensure the retention of the label ribbon 8 to the slider 11, as a result of their greater friction coefficient with respect to the first contact regions 12, so that the first and second labels 8*a* of the label ribbon 8 resting on the slider 11 are perfectly integral with the rotation of the drum 9 during the application of the glue by the spreading roller 21.

Once the glue has been applied to the trailing end and the leading end of the first and second labels 8*a* respectively, the situation shown in FIG. 8 is reached, in which the unwinding assembly 7 feeds the label ribbon 8 at a speed that is again lower than the peripheral speed of the drum 9, so that the drum 9 can slide with its lateral surface 9*a* on the label ribbon 8, so as to bring at the separation region between the first and second labels 8*a* the cutting device 19 that is located immediately behind, along the direction of rotation of the drum 9, with respect to the slider 11 that in the previous step was located at the spreading roller 21.

During the step of sliding on the label ribbon 8 of the drum 9 and, therefore, also of the slider 11 at which the glue has been applied, the connection of the vacuum source 17 to the suction openings 16 of said slider 11 is interrupted or, in any case, the degree of vacuum generated by the vacuum source 17 is reduced by the control means 18, so that the label ribbon 8 can rest almost exclusively on the first contact regions 12 of the slider, which, thanks to the lower friction coefficient with respect to the second contact regions 13, facilitate its sliding relative to the label ribbon 8.

The situation shown in FIG. 9 is thus reached, in which the cutting device 19 located immediately behind the slider 11 on which the trailing end and the leading end of the first and second labels 8*a* were resting when the glue was applied to them is now positioned, with the corresponding blade 19, at the separation region between the first and second labels 8*a*.

At this point, the label ribbon 8 is fed by the unwinding assembly 7 at the same speed as the lateral surface 9*a* of the drum 9 and the suction openings 16 of the slider 11 on which the trailing and leading ends of the first and second labels 8*a* were resting are connected again to the vacuum source 17, thus ensuring that the label ribbon 8 is retained to the drum 9, so that it is perfectly integral with the movement of said drum as a result of the adhesion action applied by the second contact regions 13 of said slider 11.

At the same time, the suction chamber 20 of the cutting device 19 that is located at the separation region between the first and second labels 8*a* is also connected to the vacuum source, so as to achieve the cutting of the label ribbon 8 between the first and second labels 8*a* by the cutting device 19.

The first label 8*a* thus cut from the label ribbon 8 is subsequently delivered by the drum 9 to the respective container 3 conveyed by the conveyor 2.

With reference instead to FIGS. 11 and 12, in the operation of the second embodiment of the machine according to the invention there is a first step, shown in FIG. 11, in which the label ribbon 8 is fed to the drum 9 at a speed that is lower than the peripheral speed of said drum, so that the drum 9 can slide with respect to the label ribbon 8.

In this first step, the suction openings 16 of the pair of sliders 11 between which the cutting element 25 that in this step faces the label ribbon 8 are disconnected from the vacuum source 17 or, alternatively, the vacuum source 17 is operated so as to generate a reduced degree of vacuum by the control means 18, so that the label ribbon 8 rests substantially on their first contact regions 12, so that the sliding of the sliders on the label ribbon 8 is facilitated.

Once the cutting element 25 facing the label ribbon 8 reaches the separation region between two consecutive labels 8*a* present on the label ribbon 8 as a result of the sliding of the drum 9 on the label ribbon 8, as shown in FIG.

12, the unwinding assembly 7 again feeds the label ribbon 8 at the same speed as the lateral surface 9*a* of the drum 9 and the suction openings 16 of the sliders 11 between which the cutting element 25 facing the label ribbon 8 is located are connected to the vacuum source 17 or, alternatively, if already connected to the vacuum source 17, the vacuum source 17 is operated by the control means 18 to create a high degree of vacuum, so as to ensure that the label ribbon 8 also rests on the second contact regions 13 of said sliders, thus ensuring that the label ribbon 8 is integral with the sliders 11 and therefore with the drum 9.

At this point, the cutting element 25 is actuated so as to cut the label ribbon 8, so as to separate from it a new label 8*a*, which is subsequently delivered by the drum 9 to the corresponding container 3 conveyed by the conveyor 2.

With reference now to the third embodiment and to FIGS. 13, 14 and 15, it can be noted that in this embodiment there is a first step, shown in FIG. 13, in which a label 8*a*, supplied to the drum 9 by the cutting roller is arranged at a sector 31*a* of the drum 9 with its leading and trailing ends resting on the sliders 11 placed at the ends of the sector 31*a* and, more particularly, with its leading end located at the spreading roller 21, so as to receive from it a strip of glue, while another label 8*a*, which is located at another sector 31*b* of the drum 9, may for example be in the condition of being able to be transferred onto the corresponding container 3 conveyed by the conveyor 2.

In this first step, the suction openings 16 of the sliders 11 located at the ends of the sector 31*a* of the drum 9 are connected to the vacuum source 17, so that the leading and trailing ends of the label 8*a* located at the sector 31*a* can adhere to the second contact regions 13 of the sliders 11 on which they rest, so as to be retained firmly to the sliders 11, without any possibility of slipping, being perfectly integral with the motion of the drum 9.

In a second step of the operation of the third embodiment, shown in FIG. 14, the sector 31*b*, which during the previous step has transferred its label 8*a* to the corresponding container 3, is ready to receive from the cutting roller 30 a new label 8*a*, while the label 8*a* on the sector 31*a* continues its movement, entrained by the drum 9 to bring its trailing end at the spreading roller 21.

In this situation, the label ribbon 8, which has not yet been cut by the cutting roller 30, is fed by the unwinding assembly 7 to the cutting roller 30 and, therefore, also to the drum 9 at a speed that is lower than the peripheral speed of the drum 9, so that the drum 9 can slide over the label ribbon 8 to bring the leading slider 11 of the sector 31*b* at the leading end of the new label 8*a* that the sector 31*b* is required to receive.

In this step, the suction openings 16 of the sliders 11 of the sector 31*b* or at least of the leading slider of the sector 31*b* are disconnected from the vacuum source 17, so that the leading slider can rest against the label ribbon 8 mainly with its first contact region 12, with the consequent possibility to being able to slide easily on the label ribbon 8, at least until the leading slider of the sector 31*b* reaches the leading end of the new label 8*a*.

In the situation shown in FIG. 15, the leading slider of the sector 31*b* has reached the leading end of the new label 8*a*.

In this situation, the label ribbon 8 is cut by the movable blade 30*a* and by the fixed blade 30*b* and in order to facilitate the cutting the suction openings 16 of the leading slider of the sector 31*b* are connected to the vacuum source, so that the label ribbon 8 is made to adhere to the second contact regions 13 of the leading slider of the sector 31*b*, thus ensuring that the new label 8*a* can be cut validly by the blades 30*a*, 30*b* and entrained by the drum 9, being perfectly integral with it.

Subsequently, the transfer of the label 8*a* located at the sector 31*a* to the corresponding container 3 occurs after the trailing slider of the sector 31*a* also has passed at the spreading roller 21.

The invention thus conceived is susceptible of numerous modifications and variations, all of which are within the scope of the appended claims; all the details may furthermore be replaced with other technically equivalent elements.

In practice, the materials used, so long as they are compatible with the specific use, as well as the contingent shapes and dimensions, may be any according to the requirements and the state of the art.

The disclosures in Italian Patent Application No. 102020000030812 from which this application claims priority are incorporated herein by reference.

The invention claimed is:

1. A labeling machine, comprising:

a label ribbon on which multiple printed labels are arranged in succession;

a conveyor of containers to be labeled along an advancement path;

at least one labeling station arranged along the advancement path, the labeling station including an assembly for unwinding the label ribbon, and at least one drum designed to receive on a lateral surface thereof the label ribbon, wherein multiple sliders are arranged at a peripheral region of the drum and are mutually angularly spaced around an axis of the drum and have at least one portion in relief toward an outside with respect to a remaining part of the lateral surface of the drum;

wherein at least one of the sliders has a first contact region and a second contact region, wherein the first contact region is made of a first material so as to be configured to engage by contact the label ribbon with a first degree of mutual adherence with respect to a material of which the label ribbon is made and the second contact region is made of a second material so as to be configured to engage by contact the label ribbon with a second degree of mutual adherence with respect to the material of which the label ribbon is made, wherein the first degree of mutual adherence is different than the second degree of mutual adherence;

wherein said first material has a first friction coefficient, with respect to the material of which said label ribbon is made, and said second material has a second friction coefficient, with respect to the material of which said label ribbon is made, said second friction coefficient being higher than said first friction coefficient;

wherein said first contact region is arranged, with respect to said second contact region, more in relief than the remaining part of the lateral surface of said drum.

2. The labeling machine according to claim 1, wherein said second material comprises a material that has a greater elastic deformability under compression than said first material.

3. The labeling machine according to claim 1, wherein said at least one slider has a face configured to make contact with said label region and said first contact region is arranged substantially in a central part of the face.

4. The labeling machine according to claim 3, wherein said second contact region is arranged in a peripheral region of the face.

5. The labeling machine according to claim 1, further comprising an additional second contact region, wherein the second contact region and the additional second contact region are each arranged laterally to said first contact region and substantially at, respectively, a front edge and a rear edge of the at least one slider along a direction of rotation of said drum.

6. The labeling machine according to claim 1, wherein said at least one slider comprises a base body, which is coupled to said drum and is made of said first material, and has, at said second contact region, at least one locking layer made of said second material and fixed to said base body.

7. The labeling machine according to claim 1, wherein each of said multiple sliders has respective suction openings which can be connected at least partially to at least one vacuum source.

8. The machine according to claim 7, wherein during a rotation of said drum said suction openings can be connected to said vacuum source, with the corresponding slider in preset angular positions with respect to the axis of said drum.

9. The machine according to claim 7, further comprising means for controlling said at least one vacuum source which are adapted to vary a degree of vacuum generated by said at least one vacuum source as a function of an angular position of said multiple sliders with respect to the axis of said drum, during the rotation of said drum.

10. A labeling machine, comprising:

a conveyor of containers to be labeled along an advancement path;

at least one labeling station arranged along the advancement path, the labeling station including an assembly for unwinding a label ribbon, and at least one drum designed to receive on a lateral surface thereof the label ribbon, wherein multiple sliders are arranged at a peripheral region of the drum and are mutually angularly spaced around an axis of the drum and have at least one portion in relief toward an outside with respect to a remaining part of the lateral surface of the drum;

wherein at least one of the sliders has a first contact region of a first material with a first friction coefficient and a second contact region of a second material that is different from the first material, the second material having a second friction coefficient that is different than the first friction coefficient;

wherein the first material has a first elastic deformability under compression and the second material has a second elastic deformability under compression, wherein the second elastic deformability is greater than the first elastic deformability;

wherein:

the first contact region is elongated in a direction parallel to the axis of the drum;

multiple second contact regions are provided;

the slider includes a front edge, a rear edge and top and bottom edges, wherein the multiple second contact regions are disposed around the first contact region at front, rear, top and bottom edges of the first contact region, wherein said second friction coefficient is higher than said first friction coefficient.

11. The machine according to claim 10, wherein the first contact region is located further from the axis of rotation of the drum than the second contact region.

12. The machine according to claim 11, wherein the second contact region abuts an edge of the first contact region, and the second contact region angles away from the first contact region and toward the axis of the drum when moving away from the edge of the first contact region, wherein said second friction coefficient is higher than said first friction coefficient.

* * * * *